United States Patent [19]

McGuire et al.

[11] Patent Number: 4,876,104

[45] Date of Patent: Oct. 24, 1989

[54] METHOD FOR PREPARING AND PRESERVING FRESH PASTA

[75] Inventors: Michael McGuire, Elmhurst; Ralph DiGiacomo, Palisades; Marcia Palmer, Nanuet; Louis Liggett, Brooklyn, all of N.Y.

[73] Assignee: General Foods Corporation, White Plains, N.Y.

[21] Appl. No.: 136,892

[22] Filed: Dec. 22, 1987

[51] Int. Cl.$^4$ ............................................. A23L 1/162
[52] U.S. Cl. ..................................... 426/57; 426/399; 426/418; 426/458; 426/521
[58] Field of Search ................. 426/94, 557, 418, 458, 426/521, 399

[56] References Cited

U.S. PATENT DOCUMENTS 3,219,456 11/1965 Matz et al. .............................. 426/94
4,493,850 1/1985 Fioravanti ............................ 426/458

OTHER PUBLICATIONS

Sunset Ed., Sunset Italian Cook Book, Apr. 1975, Lane Books, Mehlo Park, Calif., pp. 26–27.
Food Engineering, Dec. 1986, pp. 28 and 29.

Primary Examiner—Donald E. Czaja
Assistant Examiner—H. Pratt
Attorney, Agent, or Firm—Thomas R. Savoie; Daniel J. Donovan

[57] ABSTRACT

The present invention is concerned with preparing and preserving fresh pasta which maintains its freshness for up to 120 days comprising, preparing a uniform blend having a moisture of up to 30%, conditioning the uniform blend by compacting same into a dough sheet having thickness of at least 0.03 inches; cutting the dough into its desired shape or form; subjecting the cut dough to dry heat to partially dry its external surface; pasteurizing the dough by subjecting it to steam; cooling the pasteurized dough to a temperature between 30° F. and 50° F.; packaging the cooled pasteurized dough in a modified atmosphere environment; and storing the packaged dough for extended periods of time at temperatures ranging from 40° F. to 50° F.

11 Claims, 1 Drawing Sheet

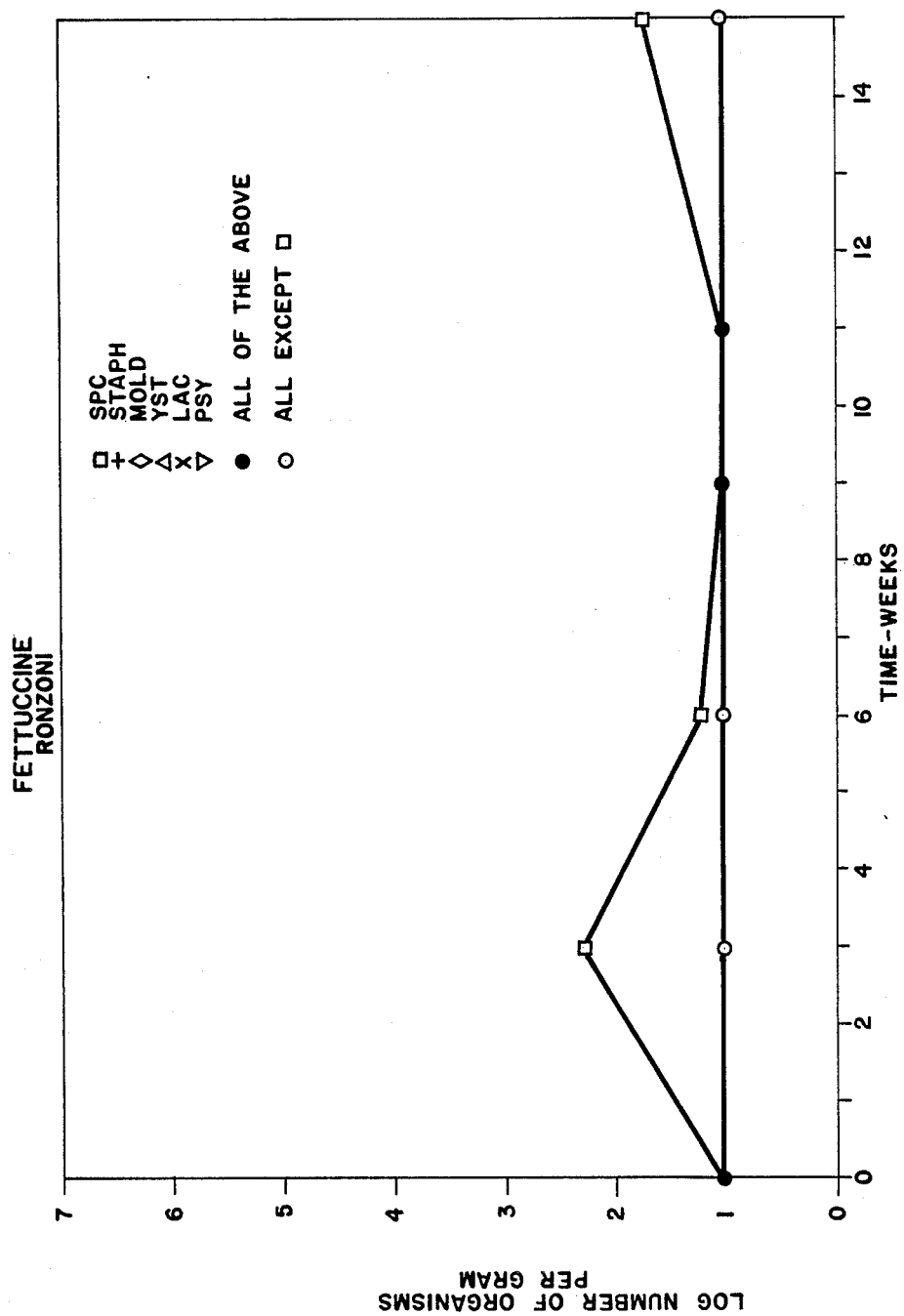

METHOD FOR PREPARING AND PRESERVING FRESH PASTA

FIELD OF THE INVENTION

The present invention is concerned with the preservation of fresh pasta. More particular, the present invention is concerned with extending the shelf life of fresh refrigerated pasta for up to 120 days while maintaining its quality attributes.

BACKGROUND OF THE INVENTION

Pasta products are generally prepared by first combining wheat flour with water and mixing to form a dough. The dough mixture is then extruded through a die and the extrudate dried under controlled temperature and humidity. Drying is typically accomplished at temperatures of up to 75° C. and relative humidity of up to 85%. To prevent cracking and breaking the rate of drying is generally relatively slow. Since the protein and starch of the dried product remain in their natural state, then prior to consumption the product must be cooked wherein the protein is denatured and the starch gelatinized. One of the major draw backs of dried pasta is uneven cooking which generally result in the central core of the pasta containing a substantial amount of undenatured protein and ungelatinized starch.

Attempts to overcome this problem is disclosed in U.S. Pat. No. 4,539,214 by Winter et al, wherein the dough is extruded at a moisture of between 28% and 40% into lengths to form a cut product having wall thickness of between 0.3 to 0.7 mm and wherein the product is simultaneously cooked and dried by exposure to dry super-heated steam in the absence of water, resulting in a rapidly rehydratable product. The product resulting therefrom, however, still does not exhibit the texture and flavor of freshly made pasta.

Other attempts to improve the quality of pasta is disclosed in U.S. Pat. No. 4,675,199 by Hsu wherein flour is mixed with from 15 to 33% water based on the weight of the flour to form a dough. The dough is then extruded through a pasta die provided with at least three superimposed nozzles for forming dough sheets, and the extruded, superimposed dough sheets are compressed into one dough sheet which is then cut to form the desired pasta shape.

In the case of stuffed pasta such as ravioli, tortellini, cannelloni and the like, long standing problems such as the inability to preserve the stuffed pasta in a good state for a certain period of time has been unresolved. Several processes have been developed to insure that neither the outer shell portion nor the inner stuffing which generally constitute meat, greens, cheese and other suitable stuffing, undergo deterioration between production and consumption. One process utilized to obtain longer storage time consists of utilizing special driers. This process, however, proved unsatisfactory. Other attempts such as freezing and overfreezing the stuffed pastas into special cooling equipment; canning of the product and subsequently processing in an autoclave; and using germicide lamps or irradiations, for example gamma rays, emitted by radioactive isotopes, all proved to be impractical and uneconomical.

Generally, the products which have undergone normal drying can only be stored for short periods of time which varies based on the composition of the stuffing and the conditions underwhich the product was prepared. However, even if proper drying of the outer casing is achieved, longer term storage would be limited mainly because of the composition of the stuffing. Attempts to overcome this problem is disclosed in U.S. Pat. No. 3,281,248 by Fioravanti et al, wherein stuffed pasta shells are immersed into a liquid selected from water, broth and a mixture of water and oil, said liquid having a temperature of from 65° to 120° C. for a period of time ranging from 1 to 240 seconds, followed by removing the stuffed shell from the liquid and heating same to temperatures ranging from 70° to 225° C. for a period of time ranging from 30 seconds to 30 minutes. It is believed, however, that the resulting product hereof produces a dough casing with a hard marble-like consistency. U.S. Pat. No. 4,493,850 on the other hand subjects the filled shell to a high moisture and temperature environment followed by drying same until the dough casing reaches a pre-determined moisture content. The dried product is then packaged under vacuum and again subjected to a high temperature environment to produce a filled dough package product with extended stability without developing signs of deterioration, and mold etc. None of these references, however, teaches maintaining freshness in texture, appearance and taste of a pasta product over extended periods of time.

It is, therefore, an object of the present invention to provide a fresh pasta product that maintains its freshness for extended periods of time.

Another object of the present invention is to provide a process for preserving fresh pasta which maintains its freshness for extended periods of time.

SUMMARY OF THE INVENTION

These and other objects will become apparent from the remainder of the specification and is more fully achieved by a process for preparing and preserving fresh pasta which maintains its freshness for up to 120 days without lowering the moisture to levels which prohibit growth of organisms which cause deterioration, comprising the steps of: preparing a uniform blend comprising flour and whole eggs having a moisture content of up to 30%; conditioning the uniform blend by compacting same to form a sheet of dough having a thickness of at least 0.03 inches; cutting the dough into a desired shape or form; subjecting the compacted dough to dry heat for a time and at a temperature effective to partially dry the external surface of the compacted dough followed by contacting the cut dough with steam for a time and at a temperature sufficient to pasteurize said cut dough; and cooling the pasteurized dough to a temperature of between about 30° F. and about 50° F. followed by packaging same in a modified atmosphere environment; and, storing the packaged product for extended periods of time at temperatures ranging from about 40° F. to about 50° F.

BRIEF DESCRIPTION OF THE DRAWING

The FIGURE is a graph which illustrates the microbiological stability of the fresh pasta of this invention.

The graph illustrates thast during the 14 week test period the levels of staph, mold, yeast (yst) lactobacillus (LAC) and psychrophiles (PSY) remained constant. The standard plate count, however, showed an increase after two and one half weeks, then gradually declined to levels of the other microorganisms and began to increase once more after ten and one half weeks during the 4 week test period psychrophiles (PSY) remained constant. The standard plate count, the levels of staph, mold, yeast (yst) latobacillus (LAC) and however, showed an increase after two and one half weeks then gradually declined to levels of the other microorganisms and begin to increase once more after ten and one half weeks.

DETAILED DESCRIPTION

The ability to produce the product of the present invention is dependent upon the cumulative effect of the steps necessary to produce the fresh pasta product. Since the presence of microorganisms play a significant role in product degradation over time, then the control of the microbial population becomes a critical factor in accomplishing the objects of the present invention. Each step contributes towards controlling the microbial population, so that the finished package product can maintain its freshness for up to 120 days.

To maintain the freshness of the pasta product of the present invention without lowering the moisture to levels which prohibit growth of organism which cause deterioration of the product, requires monitoring and taking precautionary measures at each step of the process beginning with the raw materials. These raw materials are purchased pursuant to established specification and tested prior to use to assure compliance therewith. Care is taken to prevent further contamination and to minimize microbial growth, such as storing at temperatures prior to use which inhibit microbial growth.

The process utilized in the present invention is suitable for the production of a wide variety of pastas. The first step in the process is the preparation of a dough. This is accomplished by mixing flour with whole eggs. The type of flour used maybe, for example, Durum wheat, Semolina wheat, whole wheat flour and other flours suitable for the preparation of pasta dough such as corn flour, rice flour, potato flour to name a few. It should be noted that at no point in the process of the present invention is water added to the dough.

The amount of flour in the mixture generally ranges from about 60% to about 80% by weight of the dough and preferably about 75% by weight. The amount of whole eggs generally range from about 20% to about 40% by weight of the dough and preferably about 25%. However, since the moisture of the dough is critical, and there is no added water, suitable amount of whole eggs is generally the amount necessary to achieve the desired moisture content of the dough.

Optionally, other materials may be utilized in the production of the pasta products of the present invention. For instance, protein materials such as egg white, egg yolk, wheat gluten, soy protein isolate and the like may be added to the flour in amounts ranging from about 10% to about 15% by weight of the flour. Materials such as sodium alginate, potassium alginate and other suitable gum may also be added and is generally present in amounts ranging from about 0.1% to about 1.0% by weight. Also, surfactants such as glycerol monostearate may be present in amounts ranging from about 0.1% to about 0.5% by weight.

If desired, vegetable materials such as spinach, carrot or tomato or flavors and concentrate of vegetable materials maybe added to the flour to produce flavored pasta product such as spinach pasta. These materials are generally present in amounts ranging from about 0.5% to about 5.0% by weight of the flour.

The flour, whole eggs and any other optional ingredients are mixed into a uniform blend by conventional means and monitored to ensure complete mixing. Suitable mixers include paddle mixers, ribbon mixers or continuous macaroni mixers. The moisture content of the mixed blend should generally range from about 24% to about 30% and preferably from about 27% about 28%.

The thoroughly mixed uniform blend is then made into a dough and conditioned by passing same through a dough conditioner machine consisting of a series of rollers which sheets the dough in stages to the desired thickness. The first passage through the machine produces a sheeted dough having a thickness of no greater than 0.25 of an inch. The thickness was further reduced by subsequent passage through the dough conditoner machine until the dough achieved a thickness of no less than 0.03 inch. Care should be taken, however, to insure that the moisture of the uniform blend does not fall below 24%. Failure to control the moisture will have a negative effect on the functionality of the dough, produced particularly during slicing. For instance, if the moisture falls below 24%, cracking generally occurs during subsequent processing, and if the moisture goes above 30% the dough becomes too soft and elastic, resulting in case hardening.

Conditioning of the dough can be accomplished by several other means. It is preferred, however, to utilize a "Giacomo Torresani" which uses rollers. These rollers are designed in a manner to accommodate adjustments of the distance between them so that the thickness or degree compression of the dough can be controlled. Generally the distance can vary from 0.250 inches to 0.095 inches. The final thickness of the dough is dependent on the end product desired. As the product passes through the conditioning machine, care should also be taken to prevent microbial contamination.

The sheet of conditioned or compressed dough is then cut into the desired shape or form by passing same through cutting rollers. Depending on the finished product desired, the cutting rollers may be adjusted to accommodate same. Examples of finished products are Fettuccine, Linguine, Angel's Hair and the like. In the case of Fettuccine, the product is cut in 20 inches in length and ¼ inch in thickness; Linguine, 20 inches in length and ⅛ inch in thickness; and in the case of Angel's Hair, 21 inches in length and 1/64 inch in thickness.

To prevent sticking of the pasta together during final preparation, the outer surface of the cut pasta is partially dried. Even more importantly, partially drying the pasta lowers the moisture and, hence, lowers the $A_w$, of the dough. Lowering the $A_w$ reduces the free moisture which is necessary for microorganisms to flourish. This is accomplished by subjecting the cut pasta to dry heat for from 10 seconds to 60 seconds. Heating lamps such as infrared heater supplies heat from the top downwards while heating blowers simultaneously provide a stream of hot air through the cut pasta from the bottom upwards. The infrared heat in combination with the forced hot air heat should be of sufficient intensity to create a temperature environment ranging from 350° F. to 425° F. and preferably about 400° F. Partially drying of the pasta should not be limited to the above. There are other suitable methods which could accomplish the same.

The product is then conveyed to a steamer and heated for a time and at a temperature sufficient to pasteurize the product, hence, providing a further kill step necessary to control microbial growth. The steaming step further, partially cooks the product to achieve the proper final texture by partially denaturing the protein and partially gelatinizing the starch. The temperature within the steamer is generally sufficient to achieve a product center temperature of about 180° F. Suitable product temperature, however, generally ranges from 175° F. to 185° F. The length of time the product remains in the steamer is generally determined by the time it takes to achieve the internal product temperature of 180° F. The length of time, however, generally ranges from about 3 minutes to about 5 minutes and preferably about 4 minutes. It is further believed that the steaming process destroys the enzymes naturally present within the flours thus preventing such enzymes from affecting the color, and flavor in the finished product.

The steamed product is then cooled to temperatures ranging from about 30° F. to about 50° F. prior to packaging. Care should be taken to ensure cooling under sanitary conditions. Condensation should be eliminated or minimized in an attempt to inhibit microbiological growth. The length of time required to cool the product and the moisture of the product are critical in controlling microbial growth. Faster cooling times are preferred. Typical cooling time should not exceed 4 hours. Also, segregated storage area for cooling also minimizes microbiological contamination.

The cooled product is then packaged in a sterile tray under modified atmosphere conditions for long term storage. The cooled product is first placed in a preformed tray and simultaneously with drawing a vacuum on the tray, a predetermined proportioned amount of $CO_2$ and $N_2$ are injected into the package and a layer of film is applied to the top of the tray and sealed thereto. The ratio of $CO_2:N_2$ in the modified atmosphere generally ranges from 25:75 to 80:20. The ratio of $CO_2:N_2$ will generally vary with the desired end product. It is important in the present invention that the oxygen content of the modified atmosphere be less than 1.0%.

High levels of $CO_2$ are generally preferred because they increase the storage stability life of the product. These high levels, however, generally cause product blistering. Attempts to overcome blistering include the use of dry heat to partially dry the surface of the pasta which reduces the reaction of $CO_2$ and the surface moisture. It was also found that reducing the packaging temperature of the product to temperatures ranging from 25° F. to 35° F. eliminate blistering in all the products. It is believed that low temperatures in combination with low surface moisture result in less $CO_2$ being absorbed on the surface of the product.

The packaged product is stored at temperatures ranging from 40° F. to 50° F. for up to 120 days. The actual length of time varies with the particular product and generally range from 50 days to 120 days at the required temperature.

Controlling microbial activity at each stage of the process is critical. The cumulative effect of controlling the activities at each step is necessary to produce product stability for extended periods of time.

The following examples further illustrate the present invention.

EXAMPLE 1

Wheat flour and whole eggs were mixed in a Giacomo Torresani Paddle Mixer ® to form a uniform blend having a moisture content of 28.5%. The dough was further mixed for about 7 minutes. The uniform blend was then conveyed to a dough conditioner (Giacomo Torresani) consisting of a series of rollers wherein a smooth sheet was prepared. The dough was fed through a first series of rollers to produce a sheet having thickness of 0.25 inch; then through a second series of rollers to produce thickness of 0.19 inches; and through a third series of roller to produce a thickness of 0.03 inch. The moisture of the dough during conditioning was 28.0%.

The sheeted dough was then passed through a cutter set to produce strands having a width of ¼inch and length of 20 inches. The outer surface of the cut pasta strands was partially dried by infrared heating lamps suspended above the cut pasta and forced air blowers located below the cut pasta. The surface of the cut pasta reached temperatures of 375° F.

The partially dried pasta was then folded into units weighing approximately 255 grams and conveyed to a steamer. The steamer was preset at 4 lbs./in² and 210° F., and the retention time within the steamer was 4 minutes which was sufficient to control microbial growth. The steamed pasta was then rapidly cooled to 30° F. within 45 minutes. The retention time within the cooler was critical because it affects the microbial stability of the product and the product moisture level.

The cooled product was filled into trays and transferred to the packaging line. Care was taken to minimize product breakage and microbiological contamination. The product was then sealed in a modified atmosphere environment consisting of $CO_2$ and $N_2$ at a ratio of 80:20. The package was then stored at 40° F. for up to 120 days.

EXAMPLE 2

A spinach pasta was prepared according to Example 1 except that 1.5% of spinach powder was added to the wheat flour and whole egg mixture. Also, the ratio of $CO_2$ to $N_2$ in the modified atmosphere was 80:20. The package was stored at 40° F. for up to 120 days.

What is claimed is:

1. A process for preparing and preserving fresh pasta which maintains its freshness for up to 120 days without lowering the moisture to levels which prohibit growth of organisms which cause deterioration, comprising the steps of:
    (a) preparing a uniform blend comprising flour and whole eggs having a moisture content of up to 30%;
    (b) conditioning the uniform blend by compacting some to form a sheet of dough having a thickness of at least 0.03 inches;
    (c) cutting the sheeted dough into a desired shape or form;
    (d) subjecting the cut dough to dry heat for a time ranging from 10 seconds to 60 seconds and at a temperature ranging from 35° F. to about 425° to lower the moisture and partially dry the external surface of the compacted cut dough;
    (e) contacting the cut dough with steam for a time and at at temperature sufficient to pasteurize said cut dough;
    (f) cooling the pasteurized dough to a temperature of between about 30° F. and about 50° F.;
    (g) packaging the cooled pasteurized dough in a modified atmosphere environment; and
    (h) storing the packaged product for extended periods of time at temperatures ranging from about 40° F. to 50° F.

2. A process according to claim 1 wherein the moisture content of the uniform blend ranges from about 24% to about 30%.

3. A process according to claim 1 wherein the thickness of the compacted dough ranges from 0.25 inches to 0.03 inches.

4. A process according to claim 1 wherein the conditioned dough is subjected to dry heat at a temperature of about 400° F.

5. A process according to claim 1 wherein the fresh pasta comprises fettuccine, linguine, Angel's Hair.

6. A process according to claim 1 wherein the dough is contacted with steam for a time sufficient to achieve product center temperatures of about 180° F.

7. A process according to claim 1 wherein the dough is contacted with steam for a time ranging from about 3 minutes to about 5 minutes.

8. A process according to claim 7 wherein the dough is contacted with steam for 4 minutes.

9. A process according to claim 1 wherein the modified atmosphere comprises $CO_2:N_2$ at a ratio ranging from about 25:75 to about 80:20.

10. A process according to claim 1 wherein the modified atmosphere consists of less than 1% oxygen.

11. A product produced according to the process of claim 1.

* * * * *